United States Patent
Hallnor et al.

(10) Patent No.: US 10,599,335 B2
(45) Date of Patent: Mar. 24, 2020

(54) SUPPORTING HIERARCHICAL ORDERING POINTS IN A MICROPROCESSOR SYSTEM

(71) Applicant: Intel Corporation, Santa Clara, CA (US)

(72) Inventors: Erik Hallnor, Beaverton, OR (US); Matthew Erler, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/006,505

(22) Filed: Jun. 12, 2018

(65) Prior Publication Data

US 2019/0377493 A1    Dec. 12, 2019

(51) Int. Cl.
*G06F 3/06* (2006.01)
*G06F 12/0811* (2016.01)

(52) U.S. Cl.
CPC .......... *G06F 3/0604* (2013.01); *G06F 3/0629* (2013.01); *G06F 3/0673* (2013.01); *G06F 12/0811* (2013.01); *G06F 2212/1008* (2013.01)

(58) Field of Classification Search
CPC .... G06F 3/0604; G06F 3/0629; G06F 3/0673; G06F 12/0811; G06F 12/0815; G06F 12/0831; G06F 12/0833; G06F 12/0834; G06F 2212/1008; G06F 2212/62; G06F 2212/621
See application file for complete search history.

(56) References Cited

U.S. PATENT DOCUMENTS

| | | | |
|---|---|---|---|
| 2005/0010728 A1* | 1/2005 | Piry | G06F 12/0831 711/147 |
| 2005/0160230 A1* | 7/2005 | Doren | G06F 12/0828 711/141 |
| 2005/0160231 A1* | 7/2005 | Doren | G06F 12/0828 711/141 |
| 2005/0160232 A1* | 7/2005 | Tierney | G06F 12/0831 711/141 |
| 2005/0160233 A1* | 7/2005 | Van Doren | G06F 12/0831 711/143 |
| 2005/0160237 A1* | 7/2005 | Tierney | G06F 12/0831 711/145 |
| 2005/0160238 A1* | 7/2005 | Steely, Jr. | G06F 12/0831 711/145 |
| 2005/0198440 A1* | 9/2005 | Van Doren | G06F 12/0833 711/141 |
| 2017/0308404 A1* | 10/2017 | Deshpande | G06F 12/1072 |

* cited by examiner

*Primary Examiner* — Tracy A Warren
(74) *Attorney, Agent, or Firm* — Lowenstein Sandler LLP

(57) ABSTRACT

Embodiment of this disclosure provides a hierarchical structure of ordering points. In some embodiments, the hierarchical structure includes a single primary ordering point (POP) and at least one (or more) auxiliary order point (AOP) of a processing device. In one implementation, the processing device includes one or more cores; and a coherency circuit, operatively coupled to the cores. The processing device is to receive a plurality of memory access requests to be ordered by a first ordering point of the processing device. The processing device determines whether to stop the first ordering point based on a system event. Responsive to determining that the first ordering point is stopped, a second ordering point of the processing device is identified. Thereupon, a memory access request of the plurality of memory access requests is provided to the second ordering point.

17 Claims, 12 Drawing Sheets

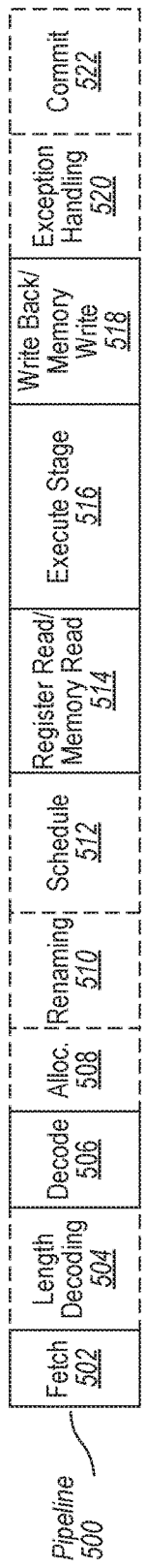
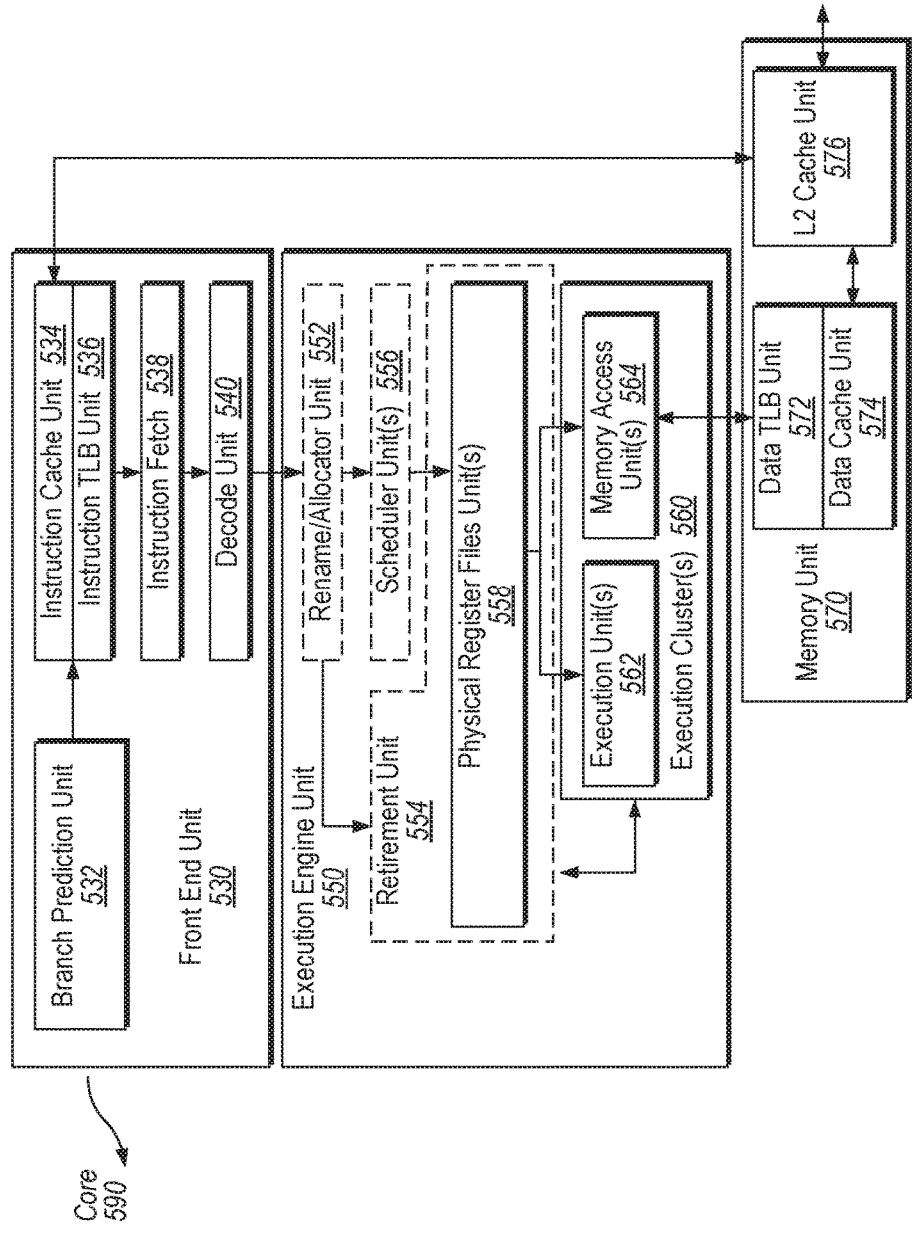
FIG. 5A
FIG. 5B

SUPPORTING HIERARCHICAL ORDERING POINTS IN A MICROPROCESSOR SYSTEM

TECHNICAL FIELD

Embodiments of the disclosure relate generally to computer systems, and more specifically, but without limitation, to supporting hierarchical ordering points in a microprocessor system.

BACKGROUND

Multi-core processors are found in most computing systems today, including servers, desktops and a System on a Chip (SoC). Such multi-core processors may include cache memory that is used for high-speed multi-threaded applications to support, for example, various types of parallel computing.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5A is a block diagram illustrating a micro-architecture for a processor according to one embodiment.

FIG. 5B is a block diagram illustrating an in-order pipeline and a register renaming stage, out-of-order issue/execution pipeline according to one embodiment.

DETAILED DESCRIPTION

Figure 1:
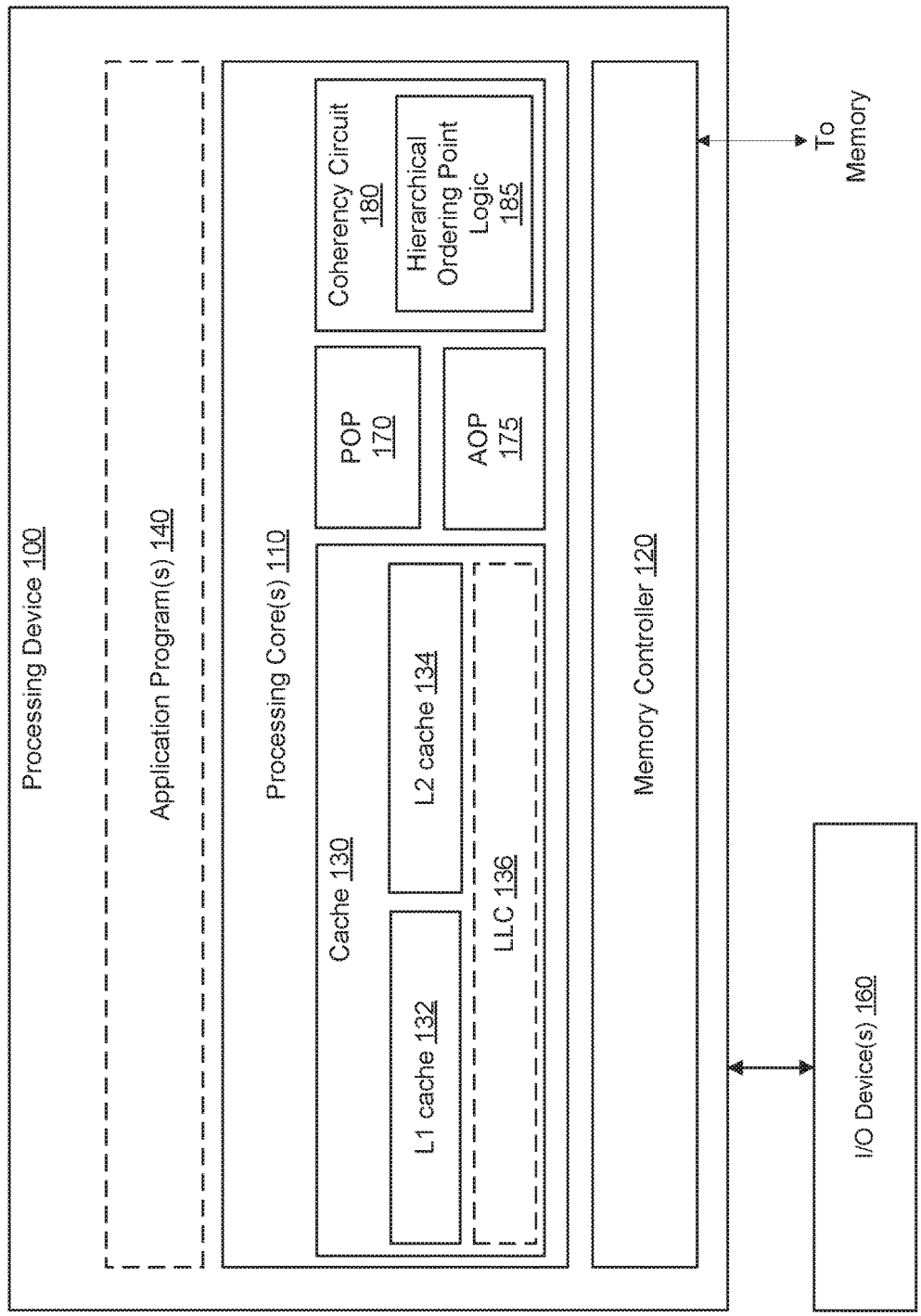
FIG. 1 illustrates a block diagram of a processing device to support hierarchical ordering points in a microprocessor system according to one embodiment.

Computing systems may achieve high performance and energy efficiency by incorporating certain processing elements (e.g., processing cores and/or special purpose processors comprising a plurality of processing cores, accelerators, input/output (I/O) devices, etc.) to handle specific tasks. In such systems, these processing elements may share common hardware components that include, but not limited to, on-die fabric, shared caches, in-package memory, network fabric, etc. To achieve high performance, each of the processing elements may be associated with cache memory. For example, in order to reduce memory access time in these types of systems, a high-speed memory called a "cache" is used to temporarily store lines of data (also referred to as a cache lines) that are currently in use by a processing element. A "cache line" is a basic unit of data storage in a cache. The cache line can include a copy of instructions and/or data obtained from main memory for quick access by the processing element. Each of the processing elements of the system may read data from their private caches and may update data in their private cache without writing the data back to a shared main memory.

In some situations, multiple copies of the same data from main memory can co-exist in systems having multiple processing elements and multiple cache memories. To ensure that the private caches of each of the processing elements are kept consistent or otherwise coherent, the system may implement a coherency protocol. The coherency protocol ensures that the contents of the cache memories accurately reflect the contents of the shared memory. In one example, a broadcast-based coherency protocol may be employed. In a broadcast-based coherency protocol, before a processing element reads or writes data to its private cache, the coherency protocol "broadcasts" a request for that data from all the other the processing elements in the system. This request in sent to all other caches and the shared memory. The element that stores or otherwise owns the data responds by forwarding that data directly to the requesting processing element. Thus, correct ownership and usage of the data is determined by the collective responses by the processing elements to the snoops.

In some systems, coherency protocol may be implemented in conjunction with an ordering point to help provide data consistency between the multiple processing elements. An ordering point is a circuit that includes hardware (e.g., registers, circuitry, dedicated logic, programmable logic, microcode, etc.), software (such as instructions run on a processor), firmware, or a combination thereof. The ordering point is operable to serialize or "order" memory operation involving the processing elements and the main memory by tracking (e.g., using various arbitrator circuits and data structures) the state of all requested data items (e.g., cache lines) throughout the system. The ordering point insures memory coherency for the processing elements that a share a memory by tracking the owner and state of requested cache lines from the memory. Some coherency protocols can take multiple messaging cycles to resolve ownership of a cache line. In that regard, the ordering point may use a snoop filter (e.g., processing logic) to quickly resolve ownership of all cache lines in the system. The snoop filter may speed up the ordering process of the ordering point by removing certain "unnecessary" snoop requests. For example, an incoming cache request for a cache line may generate snoop requests to all coherent caches. The snoop filter may remove "unnecessary" snoop requests to the cache of a particular processing element if the ordering point determines that the processing element cannot contain the cache line of the original cache request.

Upon determining which processing element is the owner of requested data (e.g., in their private cache) and which elements have copies of the data, the ordering point serializes the request for access to the data with respect to other requests for the same data. This is so that any memory operations applied to the data are seen in the same order by all the processing elements of the system. For example, when two or more coherent accesses to the same address (e.g., cache line) are serialized this ensures that ownership is clearly established for each coherent request.

In many processing systems, the amount of resources employed by the ordering point to track the state of the requested data items throughout the system is typically determined by the size of the caches associated with the processing elements. For example, in a multi-processor system having multiple processing cores there may be a massive amount of high speed parallel computations that need to be ordered by an ordering point of the system. In such cases, the ordering point must be designed with an ordering infrastructure (e.g., power circuitry, data bus/fabric, data structures, caches and other types of storage) to meet the high-bandwidth requirement of all the processors of the system. In some instances, however, certain issues may occur when the massive overhead that supports the high-bandwidth requirements of the ordering architecture is used to support ordering for other types of less computational intense processing elements of the system. For example, when providing memory operation ordering for certain I/O devices (e.g. I/O PCI-e devices) with small local caches, the ordering architecture of most multi-processor systems tends to be underutilized and inefficient, which may adversely affect system performance and response times.

Embodiments of the disclosure address the above-mentioned and other deficiencies by implementing an auxiliary ordering point that is operable to serialize memory operations for certain low powered processing elements (e.g., I/O devices) when the full capabilities of the primary ordering point are not required. The technique of the disclosure includes a coherency circuit that implements processing logic to manage a hierarchical structure of ordering points. In some embodiments, hierarchical structure includes a single primary ordering point (POP) and at least one (or more) auxiliary order point (AOP). The POP provides a certain level (e.g., 10s to 100s of Gigabits) worth of bandwidth to provide coherency for memory requests and supports the last level cache to maximize system performance. The POP tracks memory access requests of all processing elements of the system.

To improve efficiency, the AOP is configured to support less bandwidth than the POP to track the coherent memory of certain types of processing elements. For example, unlike the POP, the AOP is only responsible for tracking the coherent memory for certain processing elements that have a limited number of operations as compared to the larger processing elements being processed by the POP, or for particular I/O devices that have a limited number of outstanding transactions at a time. In some embodiments, the AOP is configured to deliver ordering at lower power than that which is used by the POP because, for example, the AOP may be implemented with fewer trackers, fewer/no snoop filtering, fewer or no caches, etc., (as compared to the POP) to track the coherency of memory operations for particular processing elements. A tracker is a memory structure that is used by the ordering point to track the status of in-flight cache line requests, such as a cache line that is in-flight between a first cache and a second cache. In this regard, a read request may go through several steps before the read data can be returned to the processing element. The tracker is used to store the state of the request (the current step it is in and some transaction attributes) and to guide the request through the remaining steps to completion (when the read data is returned to the processing element). The small processing elements (e.g., nanocores) attached to the AOP may typically generate fewer in-flight requests, so the AOP may be configured with fewer tracker entries. Since the POP snoop filter monitors all cache lines in the system, including cache lines from the larger and smaller processing elements, the AOP snoop filter is only responsible for monitoring the cache lines in the smaller processing elements that are directly attached to the AOP. In turn, this makes the AOP snoop filter smaller.

In some implementation, the coherency circuit managing the ordering points is configured to quickly switch processing elements between the POP and AOP to ensure that the system provides a certain level of responsiveness, as well as maximizing battery life to maintain optimal system performance. In operation, the POP is tracking the coherency for all memory accesses in the system, such as memory accesses for software running on a large processing element of the system. For example, the large processing elements may be elements of the system, such as processing cores, which are designed for high performance computations. The AOP is configured to track coherency for other types of small processing elements (e.g., I/O devices) that are directly attached to the AOP. The small processing elements may include, for example, certain type of I/O devices and nanocores that have a limited number of operations as compared to the larger processing elements of the system. In some embodiments, AOP operates to track coherency for the small processing elements even while the primary ordering point (POP) is active is its normal operations of ordering/tracking memory access requests, filtering snoops, etc. for the system. Once requests for the memory accesses are ordered at the AOP, the AOP sends the requests to the POP to be ordered against other requests from the rest of the system. In such cases, all coherent traffic to the system memory controller passes through the POP.

In some embodiments, certain large processing elements (e.g., processing cores) can be powered down or otherwise stopped, thus the high bandwidth and low latency of the POP is no longer necessary. For example, the large processing elements can be stopped based on various types of system events, e.g., scheduled maintenance, inactive, etc. When the POP is powered down as a result of the system event (such as the large processing elements being stopped), the AOP, in embodiments, takes control of ordering coherent traffic for any processing element directly attached to the AOP. In such cases, the AOP sends traffic directly to the memory via the memory controller, and is responsible for maintaining coherency between the caches of the processing elements attached to the AOP.

When the large processing elements (e.g., processing cores) of the processing system are shutdown, the coherency circuit of the system is configured to switch ordering points from the POP to the AOP based on, for example, some heuristic, such as the expected duration of the powered down state exceeding a threshold period of time. To switch from the POP to the AOP, the coherency circuit instructs the large processing elements to stop sending new requests and to power down. The coherency circuit instructs the AOP to stop sending new request to the POP and to complete any in-flight request. For example, once the large processing elements are stopped, the only remaining in-flight requests will be from the AOP. The AOP will need to drain all in-flight requests before dirty cache data is written back to memory. In that regard, the POP will be instructed by the coherency circuit to wait for any in-flight request to finish through all of its steps to completion before the POP is stopped. Once the in-flight requests are completed, the POP is instructed by the coherency circuit to write any dirty cache data (e.g., data not present in memory) in the POP back to the main memory. Once the requests are drained from the POP, the processing logic instructs the AOP to resume with ordering new requests from processing elements that are directly attached to the AOP. The AOP then sends all requests directly to memory, via the memory controller, after the requests have been ordered.

In some embodiments, the coherency circuit may determine that the POP is to be restarted based on a termination of the system event. For example, the coherency circuit may receive a power signal, scheduler signal, interrupt signal, an interrupt signal, timeout signal, etc., that indicates the processing cores are being reactivated by the system. In response, the POP is reactivated by the coherency circuit in a manner where the POP will make snoops to the AOP for any non-AOP request that missed the POP snoop filter. In some embodiments, the AOP could potentially be tracking any cache line in the system, but the POP snoop filter will not be able to track what the AOP has in cache because the POP was stopped. For example, when the POP is first enabled after being powered down, the POP's snoop filter is invalid and needs to be populated.

After the POP is reactivated, the coherency circuit sends a signal (e.g., processor command) to the AOP (which may invalidate every cache line it is tracking) to expose those lines to the POP. For example, the AOP may generate "probes" to invalidate copies of the data in any cache and to request forwarding of the data from the owner to the POP. Probes are commands that are issued to request data and/or cache status updates for a specific cache line identified in the probe command. In other embodiments, the AOP may not need to invalidate every cache line it is tracking in order to expose those cache lines to the POP. Once all lines in the AOP are exposed to the POP, the POP is set back, by the coherency circuit, to its normal operation of ordering requests for the processing system. As such, the coherency operation of the system is able to respond very quickly because the POP and attached large processing elements are able to start operating without requiring the AOP to write dirty data to main memory. Thus, as a result of reactivating the POP, the AOP will resume coherency operations of sending requests to the POP to be ordered against other requests from the rest of the processing system.

FIG. 1 illustrates a block diagram of a processing device 100 to support hierarchical ordering points in a microprocessor system according to one embodiment. The processing device 100 may be generally referred to as "processor" or "CPU". "Processor" or "CPU" herein shall refer to a device that is capable of executing instructions encoding arithmetic, logical, or I/O operations. In one illustrative example, a processor may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

As shown in FIG. 1, processing device 100 may include various components. In one embodiment, processing device 100 may include one or more processors cores 110 and a memory controller unit 120, among other components, coupled to each other as shown. The processing device 100 may also include a communication component (not shown) that may be used for point-to-point communication between various components of the processing device 100. In some embodiments, the processing device 100 communicate with various I/O devices 160, such as I/O bridges, PCI-e devices, Ethernet hardware, accelerated graphics cards, and harddrive controllers, which may be coupled to the processing device 100. The processing device 100 may be used in a computing system (not shown) that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processing device 100 may be used in a system on a chip (SoC) system. In one embodiment, the SoC may comprise processing device 100 and a memory (not shown). The memory for one such system is a DRAM memory. The DRAM memory can be located on the same chip as the processor and other system components. Additionally, other logic blocks such as a memory controller or graphics controller can also be located on the chip.

The processing device 100 may be used with a computing system on a single integrated circuit (IC) chip of the computing system. The instructions may include, but are not limited to, pre-fetch logic to fetch instructions, decode logic to decode the instructions, execution logic to execute instructions and the like. The computing system may be representative of processing systems based on the Pentium® family of processors and/or microprocessors available from Intel® Corporation of Santa Clara, Calif., although other systems (including computing devices having other microprocessors, engineering workstations, set-top boxes and the like) may also be used. In one embodiment, a sample computing system may execute a version of an operating system, embedded software, and/or graphical user interfaces. Thus, embodiments of the disclosure are not limited to any specific combination of hardware circuitry and software.

In an illustrative example, processing core 110 may have a micro-architecture including processor logic and circuits. Processor cores with different micro-architectures may share at least a portion of a common instruction set. For example, similar register architectures may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file). The processor core(s) 110 may execute instructions for the processing device 100. The instructions may include, but are not limited to, pre-fetch logic to fetch instructions, decode logic to decode the instructions, execution logic to execute instructions and the like. The processor cores 110 include a cache 130 to cache instructions and/or data. The cache includes, but is not limited to, a level one, level two, and a last level cache (LLC), or any other configuration of the cache memory within the processing device 100.

Memory controller 120 may perform functions that enable the processing device 100 to access and communicate with memory (not shown) that includes a volatile memory and/or a non-volatile memory. In some embodiments, the memory controller 120 may be located on a processor die associated with processing device 100, while the memory is located off the processor die. In some embodiments, the processing device 100 includes a cache unit 140 to cache instructions and/or data. The cache unit 130 includes, but is not limited to, a level one (L1) 132, level two (L2) 134, and a last level cache (LLC) 136, or any other configuration of the cache memory within the processing device 100. In some embodiments, the L1 cache 132 and L2 cache 134 can transfer data to and from the LLC 136. In one embodiment, the memory controller 120 can be connected to the LLC 136 to transfer data between the cache unit 130 and memory. As shown, the cache unit 130 can be integrated into the processing cores 110. The cache unit 130 may store data (e.g., including instructions) that are utilized by one or more components of the processing device 100.

In some embodiments, the processing device 100 executes one or more application programs 140 (e.g., a user-level multithreaded application). Such application programs 140 may include or be executed by system software (not shown) installed at the processing device 100. Examples of system software include, but are not limited to, one or more operating systems, a virtual machine monitor (VMM), a hypervisor, and the like, and combinations thereof. The application programs 140 may use instructions (e.g., branch instructions 160) to control the processing device 100 as disclosed herein. The instructions may represent macro instructions, assembly language instructions, or machine-level instructions that are provided to the processing core 110 for execution. During the execution of an application program 140, the processing device 100 generates memory requests (e.g., load operations) when program instructions or data are required. The memory request is tied to an address or group of addresses in the main memory. To increase efficiency, recently used instructions or data are stored in the cache memory 130, which is much faster than the external main memory.

A "cache" or "cache memory" as used herein, including the L1 cache 132, L2 cache 134 and LLC 136, may be a hardware component associated with the processing device 100 that stores cache lines for use by processing elements (e.g., processor cores 110, I/O devices 160, etc.) associated with the processing device 100. The processing elements of processing device 100 may access a cache line within a cache using any operation/instruction (e.g., performing arithmetic or logic functions). A cache line may be a basic unit of storage in a cache and may be referred to as a block or a sector of memory (e.g., a cache) that may be managed as a unit for coherence purposes. In some embodiments, a cache line within a cache may be between 16-256 bytes. A cache line may be stored in cache memory (e.g., in a L1 cache 132, L2 cache 134 and LLC 136), system memory, or combinations thereof. The cache memory may refer to a memory buffer inserted between one or more processors on a bus (not shown), for example, to store/hold currently active copies of cache lines, (e.g., blocks from system (main) memory).

In various implementations, the processing device 100 may further include a coherency circuit 180. The coherency circuit 180 may be implemented as a plurality of hardware components (e.g., registers, tables, data structures, etc.) and processing logic configured to implement a coherency protocol. In some implementations, the coherency circuit 180 may be implemented as part of a primary ordering point (POP) 170 and auxiliary order point (AOP) 175. In other implementations, the coherency circuit 180 may be a separate unit of the processing device 100 and operate in conjunction with the POP 170 and AOP 175.

A coherency protocol implemented by the coherency circuit 180 determines which processing element of processing device 100 "owns" a particular cache line and which elements have copies of the line. The coherency protocol implemented by the coherency circuit 180 ensures that contents of any cache associated with processing device 100, including cache memories 130, 132, 134 and 136, accurately reflect the contents of the main memory. In one example, the coherency circuit 180 implements a broadcast-based coherency protocol. In a broadcast-based coherency protocol, before data is accessed in the cache, the coherency protocol "broadcasts" (also referred to as snoops) a request for that data from all the other the processing elements associated with processing device 100. The processing element that stores or otherwise owns the data responds by forwarding that data directly to the requesting processing element. Thus, correct ownership and usage of the data is determined by the collective responses by the processing elements to the snoops.

To help provide coherency of the cache lines, the processing device 100 may implement a primary ordering point (POP) 170. The POP 170 may include hardware (e.g., registers, circuitry, dedicated logic, programmable logic, microcode, etc.), software (such as instructions run on a processor), firmware, or a combination thereof. The POP 170 is operable to serialize or "order" memory accesses involving the processing device 100 by tracking the state of the requested cache lines throughout the device. In some implementation, the POP 170 may implement a snoop filter (e.g., processing logic) to speed up ordering by removing certain "unnecessary" snoops. For example, the snoop filter can identify that a snoop is "unnecessary" by determining whether an incoming cache request should be filtered without performing an intra-processing element cache snoop operation. This is because, e.g., the requested data cannot be supplied from a particular processing element associated with the processing device 100.

As shown in FIG. 1, the processing device 100 also implements as least one auxiliary order point (AOP) 175. The AOP 175 is operable to serialize memory access requests for certain low powered processing elements (e.g., I/O devices) when the full capabilities of the primary ordering point are not required. Similar to the POP 170, the AOP 175 may also include hardware (e.g., registers, circuitry, dedicated logic, programmable logic, microcode, etc.), software (such as instructions run on a processor), firmware, or a combination thereof. Unlike the POP 170, however, the AOP 175 is only responsible for tracking the coherent memory for processing elements (e.g., I/O device 160) that are directly attached to the AOP 175, for example, via a communication fabric (not shown). The AOP 175 is configured to support less bandwidth than the POP to track the coherent memory of particular processing elements. For example, the AOP 175 uses less trackers, less/no snoop filtering, less/no internal cache, etc., to track the coherent memory for the attached processing elements. These processing elements may include, for example, processing elements having memory without any cache support, or particular I/O devices that have a limited number of outstanding transactions at a time.

To manage the POP 170 and AOP 175, the processing device 100 implements hierarchical ordering point logic 185. The hierarchical ordering point logic 185 allows the coherency circuit 180 to determine when to switch between the POP 170 and AOP 175. For example, the hierarchical ordering point logic 185 is configured to switch ordering points for the processing device 100 from the POP 170 to the AOP 175 and back based on certain system events. The hierarchical ordering point logic 185, in embodiments, may be implemented as part of the coherency circuit 180. In alternative embodiments, the hierarchical ordering point logic 185 may be implemented in a separate hardware component, circuitry, dedicated logic, programmable logic, microcode of the processing device 100 or any combination thereof. In some embodiments, the hierarchical ordering point logic 185 of the coherency circuit 180 may operate in conjunction with the POP 170 and AOP 175. For example, the hierarchical ordering point logic 185 may activate the POP 170 and/or AOP 175 to receive, track and determine coherency of cache lines to ensure that contents of the cache memories associated with processing device 100 accurately reflect the contents of the main memory, as discussed in more detail below.

Figure 2:
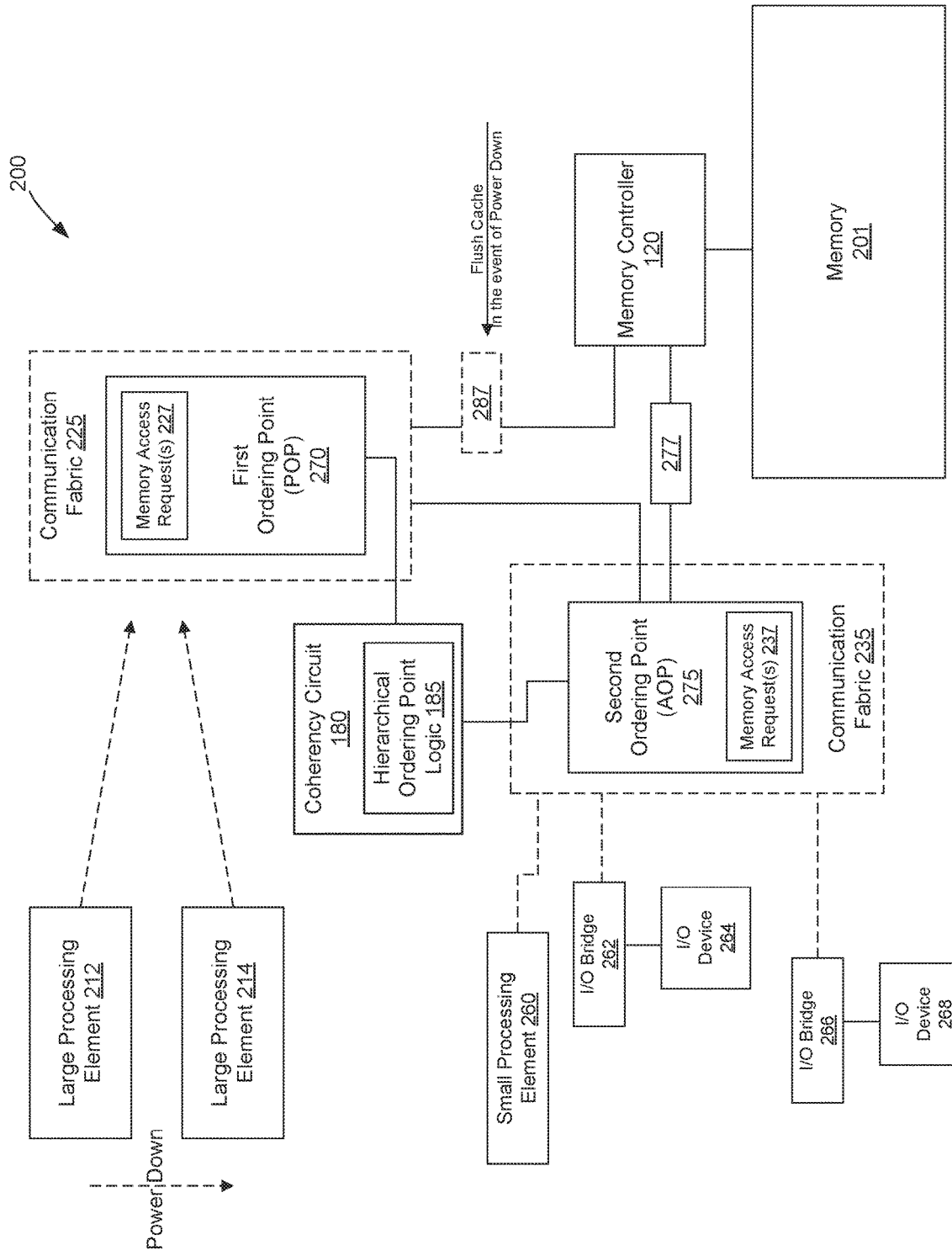
FIG. 2 illustrates a block diagram of a processing system including a memory to support hierarchical ordering points in a microprocessor system according to one embodiment.

FIG. 2 illustrates a block diagram of a processing system 200 including a memory 201 to support hierarchical ordering points in a microprocessor system according to one embodiment. In this example, the processing system 200 may be the same or similar to processing device 100 or a component of processing device 100, such as one of the processing cores 110. For example, the processing system 200 includes the coherency circuit 180, which implements the hierarchical ordering point logic 185 of FIG. 1. The hierarchical ordering point logic 185 allows the processing system 100 to determine when to switch between hierarchical structures that include a first ordering point (also referred to as a single primary ordering point (POP) 270, and at least one (although more are possible) second ordering point (also referred to as an auxiliary order point (AOP) 275). The POP 270 operable to serialize or "order" memory access requests 227 involving any processing element, such as the large processing elements 212, 214 (which may be the same or similar to the processing cores 110 of FIG. 1, and a (shared) memory 201. The AOP 275 is configured to track memory access requests 237 for processing elements (e.g., I/O devices 264, 268) that are directly attached to the AOP 275.

The memory 201, in embodiments, may be, for example, on-chip main memory, off-chip main memory, ROM, or a cache such as found in processing device 100 of FIG. 1. In some situations, the memory 201 may be shared by, for example, several large processing elements 212, 214 (e.g., processing cores 110), small processing elements 260 (e.g., nanocores that have less cache and/or less capabilities than the larger processing elements, one more I/O devices 264, 268, or host I/O bridges 264, 268 connect to the I/O devices 264, 268, as well as other type of processing elements of system 200. In various components, the processing elements may issue transactions (e.g., memory access requests) in system 200 directed towards cache lines associated with memory 201. To this end, system 200 includes communication fabric 225, 235 or architecture that provides for a transfer of data between different components or devices attached to the fabric or architecture of system 200. A communication fabric 225, 235, may include one or more devices, controllers, caches, etc., that is used to transmit and receive data.

In some embodiments, the communication fabric 225, 235 is inherently unordered when transmitting transactions in a multiprocessor computer system, such as system 200. As such, the system 200 implements the POP 270 to order the transactions associated with the memory access requests 227 by tracking the state of the requested data items (e.g., cache lines) throughout the system 200. For example, the coherency circuit 180 may receive a plurality of requests comprising memory access requests associated with memory 201. The POP 270 is configured to order these memory access requests 227 to provide coherency for system 200. To order these memory operations 227, the POP 270 may utilize, for example, memory structures (e.g., tables) for tracking a plurality of outstanding transactions, large last-level caches (LLCs), high frequency buses for lowering the latency of certain traffic and wide buses for increasing bandwidth for the large processing elements 212, 214.

In operation, the AOP 275 is configured to track memory access requests 237 for certain processing elements (e.g., I/O devices 264, 268). For example, the type of processing elements that may be coupled to the AOP 275 may include certain type of I/O devices and nanocores that have a limited number of operations as compared to the larger processing elements 212, 214 of the system 200. In some embodiments, the AOP 275 is configured to implement ordering by utilizing, e.g., less trackers, less or no snoop filtering, less or no caches, etc than the POP 270. The AOP 275 may internally order memory access requests 237, even while the POP 270 is active and ordering memory access requests 227 for the rest of system 200. Once the memory access requests 227 are ordered, the AOP 275 transmits the operations to the POP 270. The POP 270 then orders the memory access requests 237 with the memory access requests 227 for the rest of the system 200. Thereupon, the POP 270 then transmits all coherent memory traffic (e.g., the order memory access requests 227, 237) to memory 201 via the memory controller 130.

In some embodiments, system 200 may switch between operating modes in which the AOP 275 can send traffic directly the memory controller, and is responsible for maintaining coherency for certain processing elements of system 200. Switching between the POP 270 and the AOP 275 can be triggered in several ways, such as by hardware (e.g., based on certain system events) or software (e.g., power management or OS plugins). In one example, the switch between the POP 270 and the AOP 275 can be triggered when the POP 270 of system 200 is powered down or otherwise stopped. For example, the coherency circuit 180 may switch between the POP 270 and AOP 275, if it determines that the expected length of the powered down state exceeds a threshold period of time. In that regard, the coherency circuit 180 may receive a signal from system 200 that the large processing elements 212, 214 are to be powered down for a certain amount of time. In one embodiment, the signal may include an indication that the large processing elements 212, 214 are to be powered down in accordance with the system event, such as for a scheduled maintenance/shutdown or based on the current system inactivity satisfying a threshold level.

When the POP 270 is powered down as a result of the system event, the hierarchical ordering point logic 185 of coherency circuit 180 may identify the AOP 275 to take responsibility for ordering coherent traffic for any processing element directly attached to the AOP 275. In such cases, the AOP 275 sends coherent traffic 277 (e.g., order memory access requests) directly to the memory controller 120. To switch from the POP 270 to the AOP 275, the hierarchical ordering point logic 185 instructs the large processing elements 212, 214 to stop sending request and power down. In some embodiment, the large processing elements 212, 214 may already be idle and powered down due to the system event. The hierarchical ordering point logic 185 then instructs the AOP 275 to stop sending new request to the POP 270 and to complete an in-flight request 227. For example, once the large processing elements 212, 214 are stopped, the only remaining in-flight requests 227 will be from the AOP 275. In some embodiments, the POP 270 will be instructed by the coherency circuit 180 to wait for any in-flight request to finish through all of its steps to completion. Once the in-flight requests are completed, the hierarchical ordering point logic 185 instructs the POP 270 to write any dirty cache data 287 of the POP 270 back to memory 201.

After the dirty cache data 287 of the POP 270 is written back to memory 201, the hierarchical ordering point logic 185 of coherency circuit 180 instructs the POP 270 to power down. Then, the hierarchical ordering point logic 185 instructs the AOP 275 to resume ordering operations. For example, while the POP 270 is stopped, the AOP 275 is responsibility for ordering coherent traffic of directly attached processing elements, such as small processing element 260, I/O device 264 and 268 and other devices directly attached to the AOP 275. Thereupon, the AOP 275 in accordance with instructions from hierarchical ordering point logic 185 of the coherency circuit 180 transmits all internally order memory access requests 277 directly to memory 201 via memory controller 120.

Figure 3:
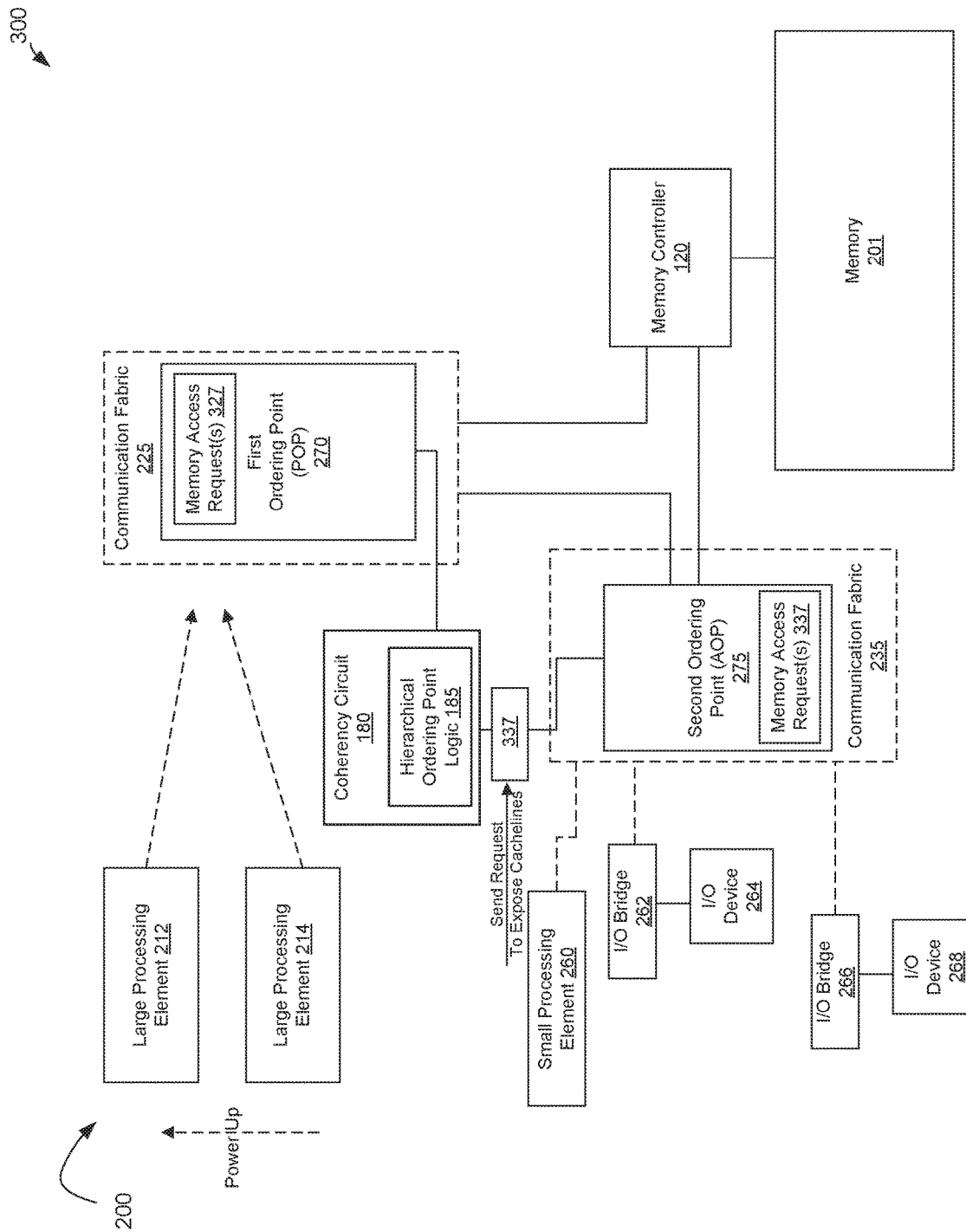
FIG. 3 illustrates a block diagram of another view of the processing system of FIG. 2 to support hierarchical ordering points in a microprocessor system according to one embodiment.

FIG. 3 illustrates a block diagram of another view 300 of the processing system 200 of FIG. 2 to support hierarchical ordering points in a microprocessor system according to one embodiment. In this example, when the large processing elements 212, 214 are powered back up, the hierarchical ordering point logic 185 implemented by coherency circuit 180 the may switch the operating mode of system 200 from the AOP 275 back to the POP 270. For example, the coherency circuit 180 may determine that the POP 270 is to be restarted based on a termination of the system event. For example, the coherency circuit 180 may receive a signal from system 200, for example, a power, scheduler, interrupt or timeout signal or other types of signals that the large processing elements 212, 214 are returning to their regular activity level.

When the coherency circuit 180 receives a signal of a termination of the system event, the hierarchical ordering point logic 185 reactivates the POP 270 in a manner in which the POP 270 will make snoops to the AOP 275 for any non-AOP request that misses the POP snoop filter. For example, the AOP 275 could potentially be tracking any cache line in the system, but the POP 270 snoop filter will not be able to track what the AOP 275 has in cache because the POP 270 was stopped.

After the POP 270 is reactivated, the hierarchical ordering point logic 185 of the coherency circuit 180 may send a signal 337 (e.g., processor command) to the AOP 275 to invalidate every cache line that the AOP is tracking and expose those lines to the POP 270. For example, the AOP 275 may generate "probes" to invalidate (e.g., remove) copies of the data and to request forwarding of the data from the owner to the POP 270. Probes are commands issued to request data and/or cache status updates for a specific cache line identified in the probe command. In other embodiments, the AOP 275 may not need to invalidate every cache line it is tracking in order to expose those cache lines to the POP 270. Once all lines being cached in the AOP 275 are exposed to the POP 270, the POP 270 is set back, by the hierarchical ordering point logic 185, to its normal operation of ordering requests for system 200. Thus, as a result of reactivating the POP 270, the AOP 275 resumes the operation of sending requests to the POP 270 to be ordered against other requests from the rest of system 200.

Figure 4:
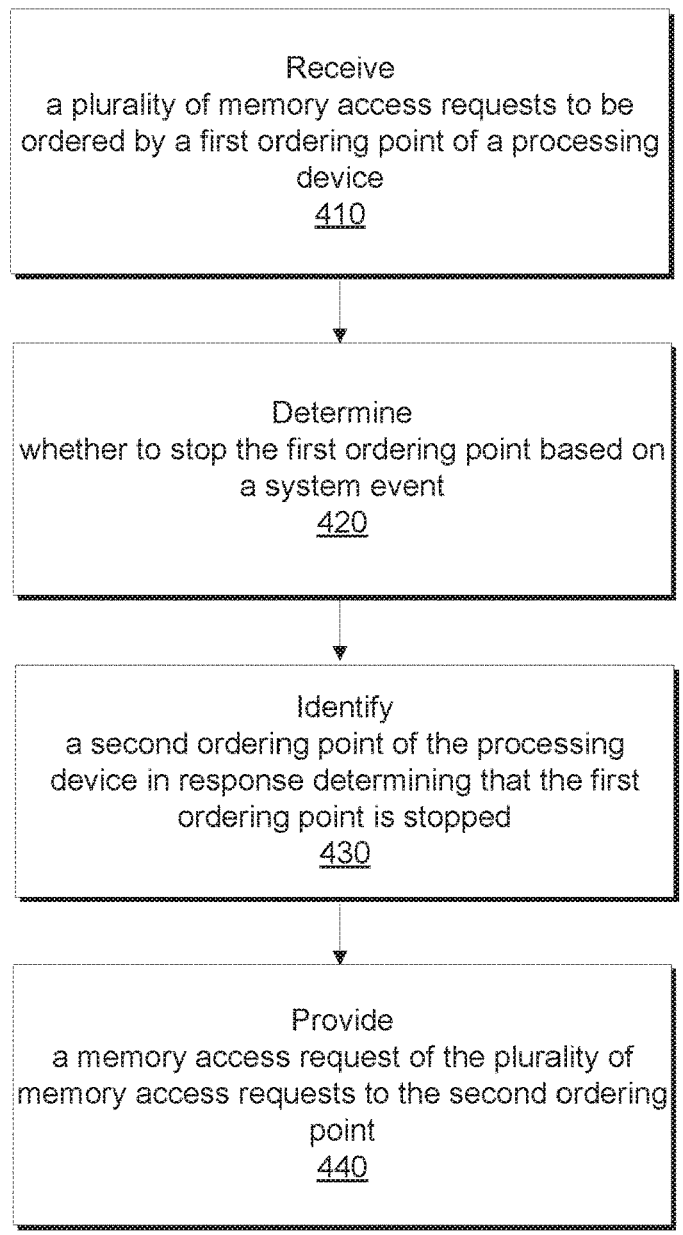
FIG. 4 illustrates a flow diagram of a method for supporting hierarchical ordering points in a microprocessor system according to one embodiment.

FIG. 4 illustrates a flow diagram of a method 400 for supporting hierarchical ordering points in a microprocessor system according to one embodiment. Method 400 may be performed by processing logic that may comprise hardware (e.g., circuitry, dedicated logic, programmable logic, microcode, etc.), software (such as instructions run on a processing device), firmware, or a combination thereof. In one embodiment, the coherency circuit 180 as instructed by hierarchical ordering point logic 185 of processing device 100 in FIG. 1 may perform method 400. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various embodiments. Thus, not all processes are required in every implementation. Other process flows are possible.

Referring to FIG. 4, in block 410, method 400 receives a plurality of memory access requests to be ordered by a first ordering point of a processing device. In block 420, it is determined whether to stop the first ordering point based on a system event. Responsive to determining that the first ordering point is stopped, a second ordering point of the processing device is identified in block 430. A memory access request of the plurality of memory access requests is provided in block 440 to the second ordering point.

FIG. 5A is a block diagram illustrating a micro-architecture for a processor 500 that implements techniques for supporting hierarchical ordering points in a microprocessor system functionality in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front-end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). The execution engine unit 550 may include for example a power management unit (PMU) 590 that governs power functions of the functional units.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

In one implementation, processor 500 may be the same as processing device 100 described with respect to FIG. 1 to implement techniques for supporting hierarchical ordering points in a microprocessor system with respect to implementations of the disclosure.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in the in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processor 500 of FIG. 5A according to some embodiments of the disclosure. The solid lined boxes in FIG. 5B illustrate an in-order pipeline, while the dashed lined boxes illustrate a register renaming, out-of-order issue/execution pipeline. In FIG. 5B, a processor pipeline 501 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
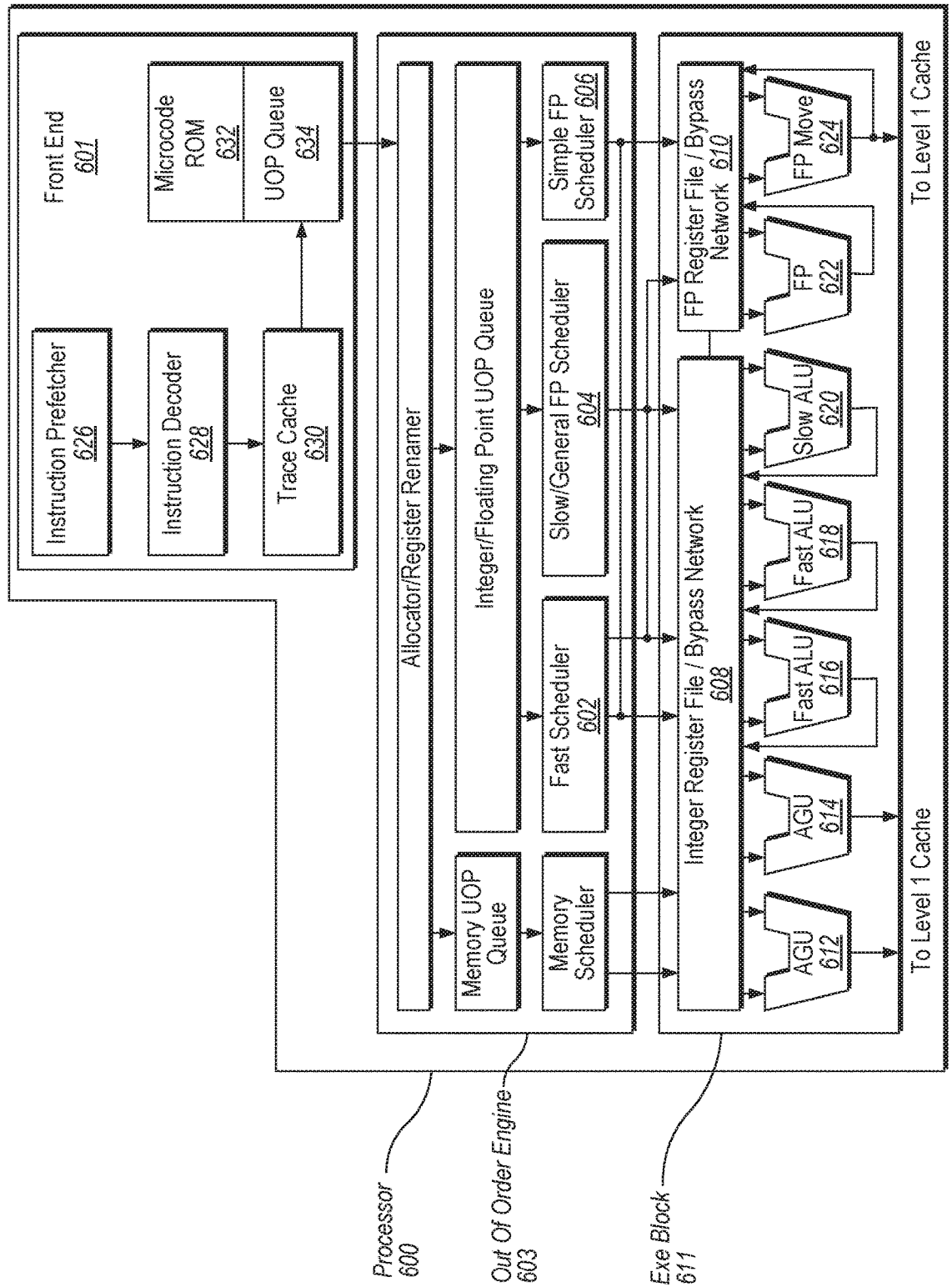
FIG. 6 is a block diagram illustrating a computer system according to one implementation.

FIG. 6 illustrates a block diagram of the micro-architecture for a processor 600 that includes logic circuits to implement techniques for supporting data compression using match-scoring functionality in accordance with one embodiment of the disclosure. In some embodiments, an instruction in accordance with one embodiment can be implemented to operate on data elements having sizes of byte, word, double word, quad word, etc., as well as data types, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628, which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct microinstruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610 sit between the schedulers 602, 604, 606, and the execution units 612, 614, 616, 618, 620, 622, 624 in the execution block 611. There is a separate register file 608, 610, for integer and floating-point operations, respectively. Each register file 608, 610, of one embodiment also includes a bypass network that can bypass or forward just completed results that have not yet been written into the register file to new dependent uops. The integer register file 608 and the floating-point register file 610 are also capable of communicating data with the other. For one embodiment, the integer register file 608 is split into two separate register files, one register file for the low order 32 bits of data and a second register file for the high order 32 bits of data. The floating-point register file 610 of one embodiment has 128 bit wide entries because floating-point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the microinstructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating-point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the disclosure, instructions involving a floating-point value may be handled with the floating-point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. The AGUs 612, 614, executes memory load/store operations. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating-point units 622, 624, can be implemented to support a range of operands having bits of various widths. For one embodiment, the floating-point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement hierarchical ordering points according to embodiments of the disclosure. In one embodiment, the execution block 611 of processor 600 may include cache controller 140 for FIG. 1, for implementing techniques for supporting the hierarchical ordering points. In some embodiments, processor 700 may be the processing device 100 of FIG. 1.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32 bit integer data. A register file of one embodiment also may contain an eight multimedia SIMD register for packed data.

For the discussions below, the registers are understood to be data registers designed to hold packed data, such as 64 bits wide MMX™ registers (also referred to as 'mm' registers in some instances) in microprocessors enabled with MMX™ technology from Intel Corporation of Santa Clara, Calif. These MMX™ registers, available in both integer and floating point forms, can operate with packed data elements that accompany SIMD and SSE instructions. Similarly, 128 bits wide XMM™ registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
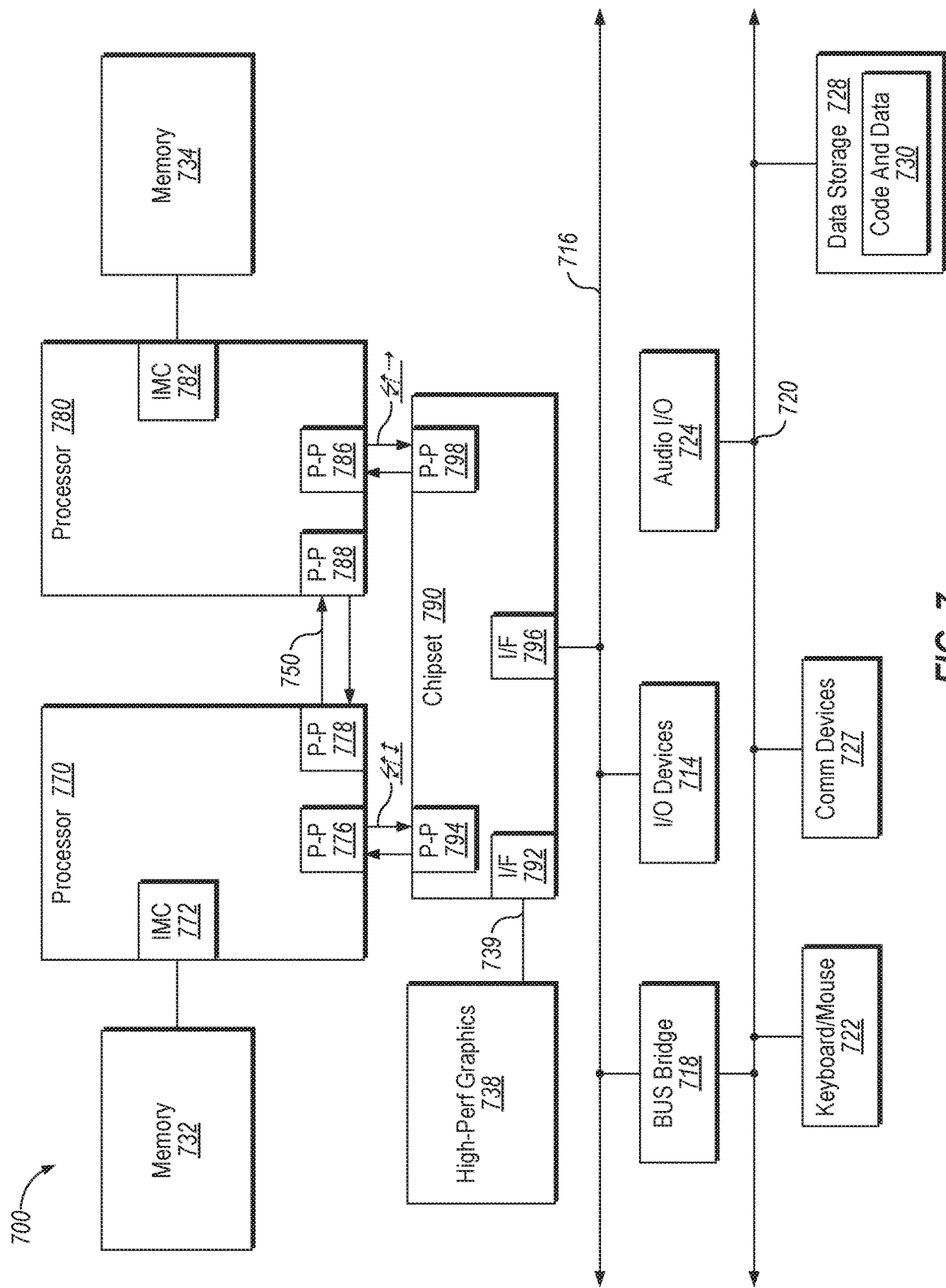
FIG. 7 is a block diagram illustrating a system in which an embodiment of the disclosure may be used.

Embodiments may be implemented in many different system types. Referring now to FIG. 7, shown is a block diagram illustrating a system 700 in which an embodiment of the disclosure may be used. As shown in FIG. 7, multi-processor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement techniques for supporting hierarchical ordering points as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
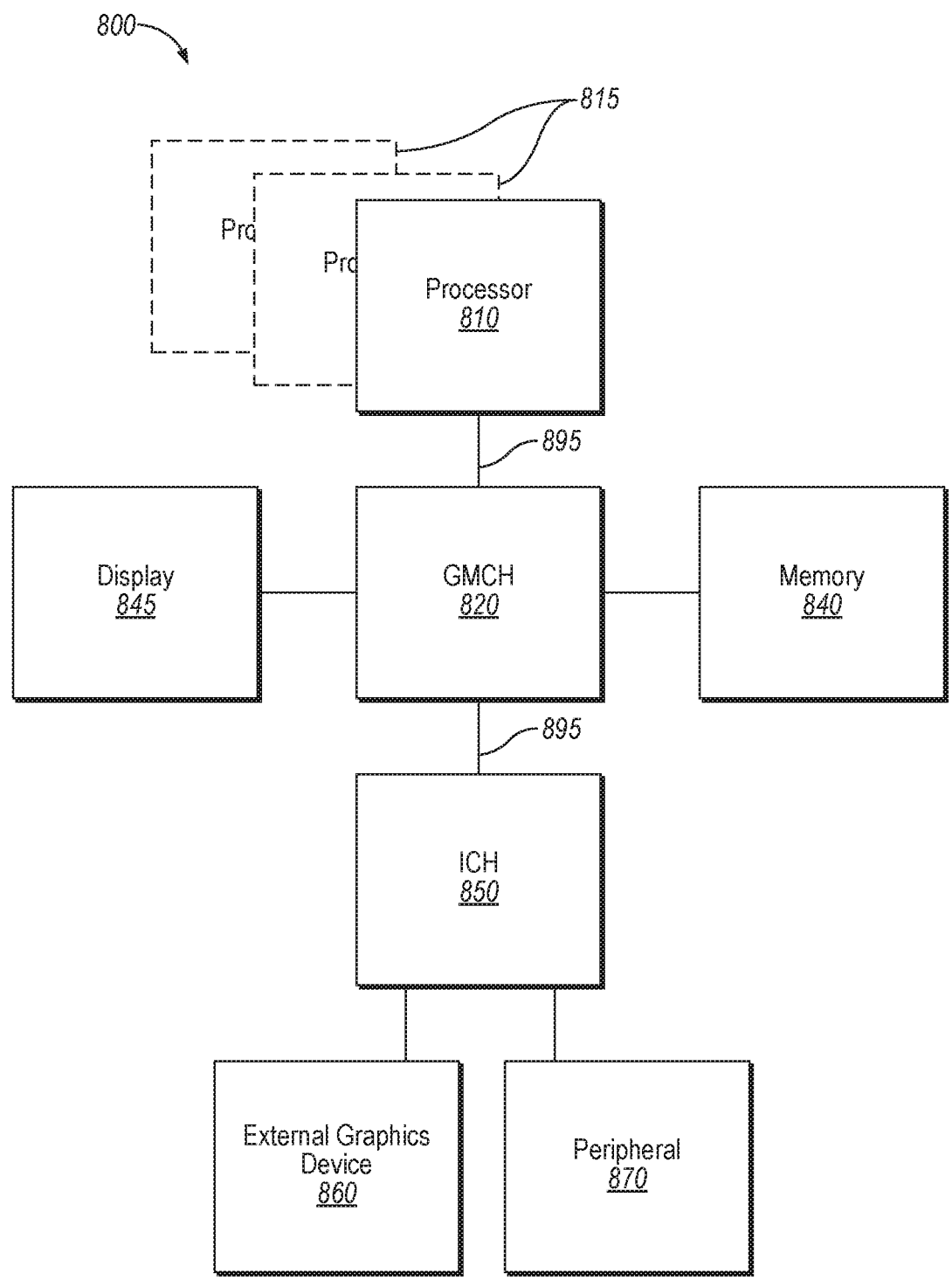
FIG. 8 is a block diagram illustrating a system in which an embodiment of the disclosure may be used.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement techniques for supporting hierarchical ordering points according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
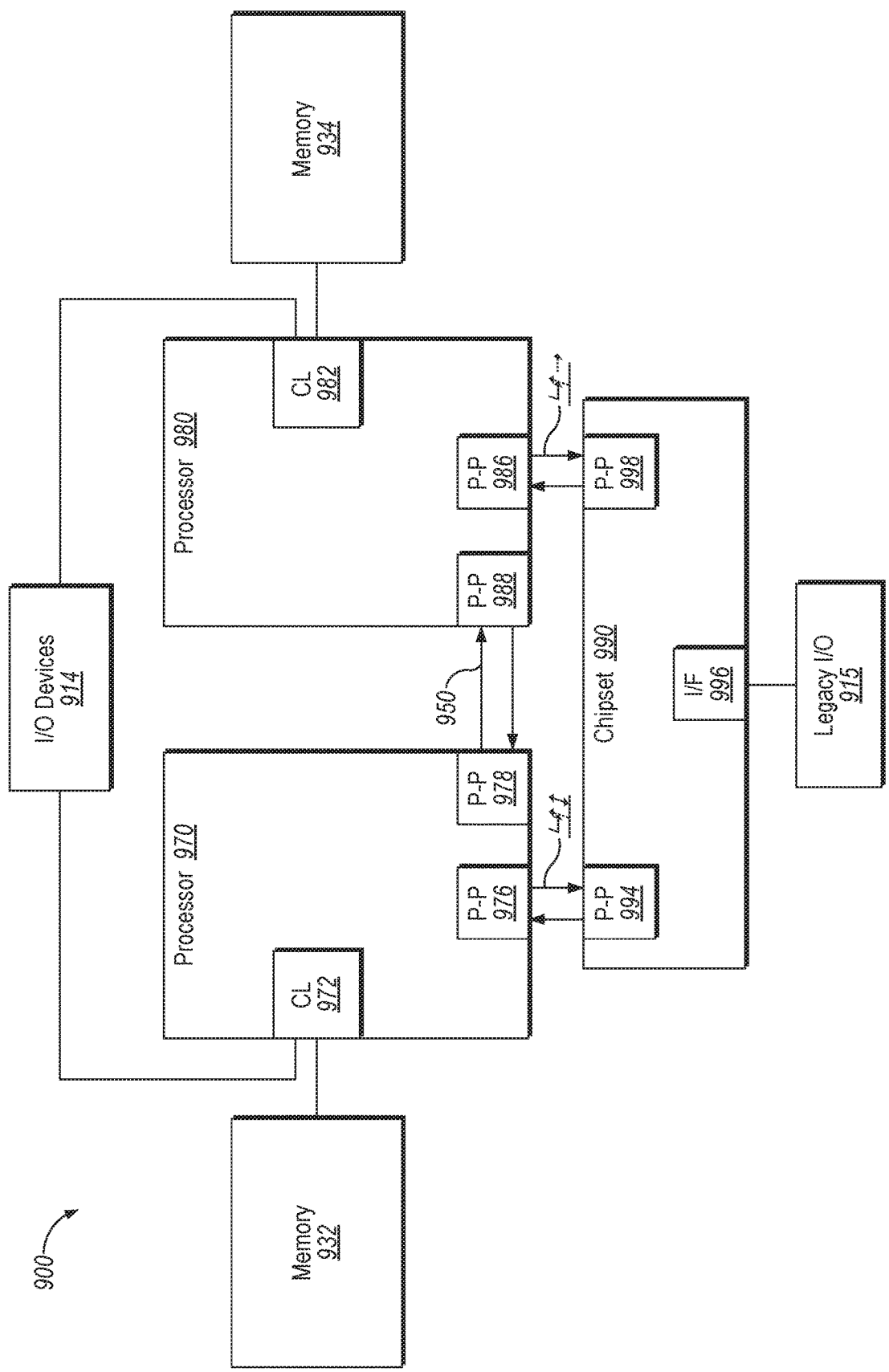
FIG. 9 is a block diagram illustrating a system in which an embodiment of the disclosure may be used.

Referring now to FIG. 9, shown is a block diagram of a system 900 in which an embodiment of the disclosure may operate. FIG. 9 illustrates processors 970, 980. In one embodiment, processors 970, 980 may implement techniques for supporting hierarchical ordering points as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
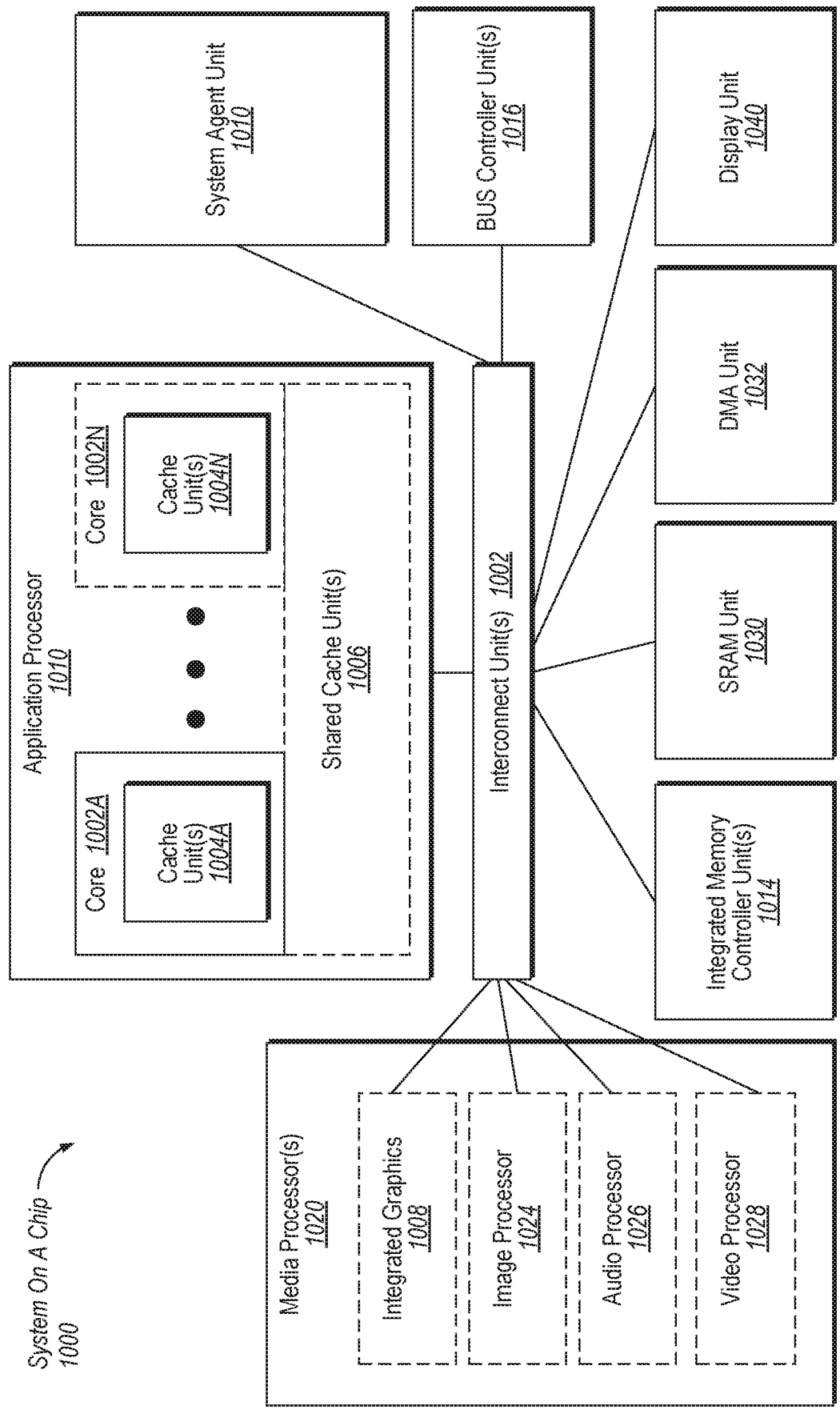
FIG. 10 is a block diagram illustrating a System-on-a-Chip (SoC) in which an embodiment of the disclosure may be used.

Embodiments may be implemented in many different system types. FIG. 10 is a block diagram of a SoC 1000 in accordance with an embodiment of the disclosure. Dashed lined boxes are optional features on more advanced SoCs. In one embodiment, SoC 1000 may the same as of processing device 100 of FIG. 1 to implement techniques for supporting hierarchical ordering points as described in embodiments herein. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set of one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a PMU for implementing the coherency circuit 180 as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multithreading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogeneous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
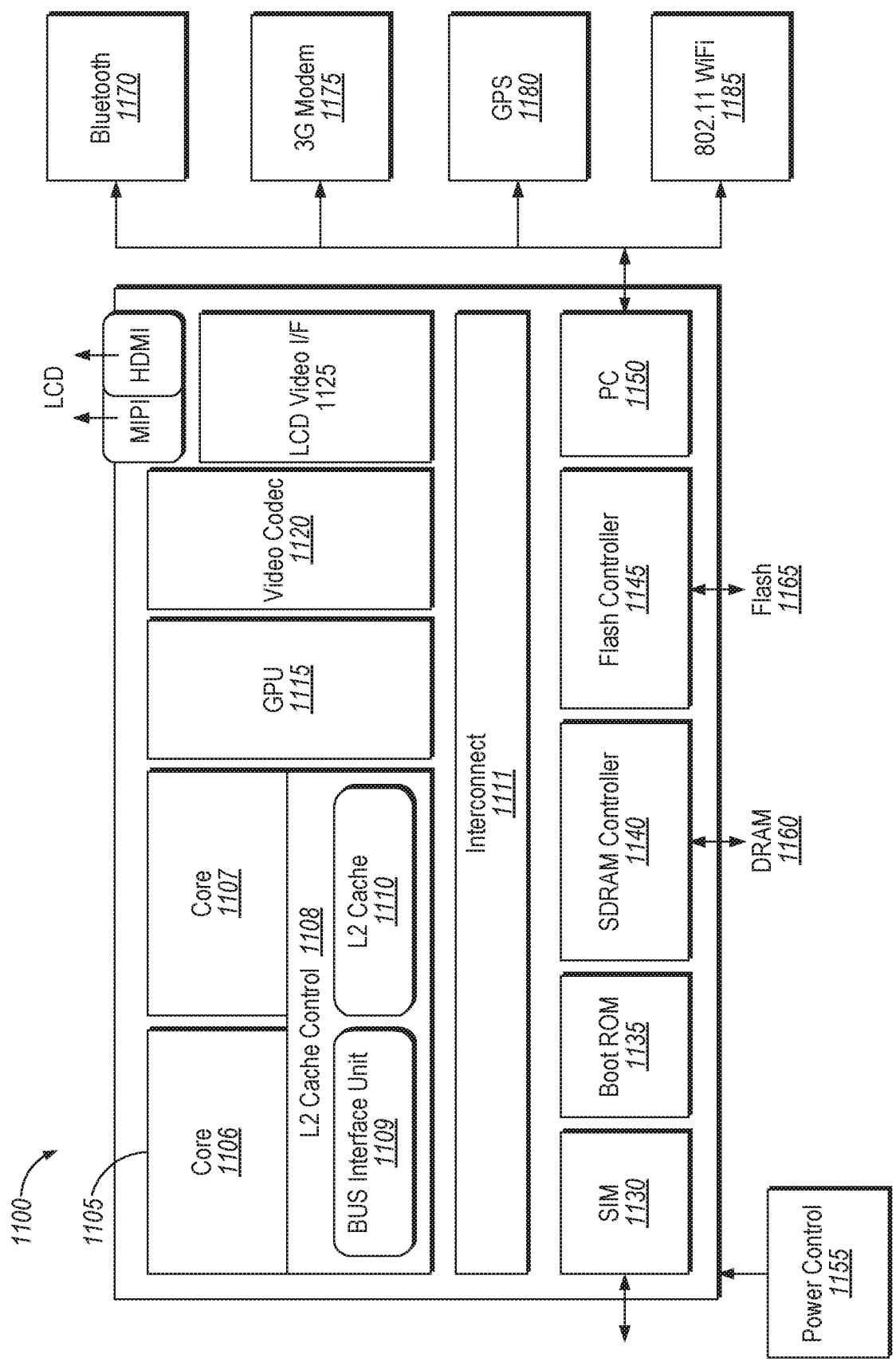
FIG. 11 is a block diagram illustrating a SoC design in which an embodiment of the disclosure may be used.

FIG. 11 is a block diagram of an embodiment of a system on-chip (SoC) 1100 design in accordance with the disclosure. In one embodiment, SoC 1100 may the same as of processing device 100 of FIG. 1 to implement techniques for supporting hierarchical ordering points as described in embodiments herein. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107 (which may be the same as the processing cores 110 of FIG. 1). Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement techniques for supporting hierarchical ordering points as described in embodiments herein.

Interconnect 1110 provides communication channels to the other components, such as a Subscriber Identity Module (SIM) 1130 to interface with a SIM card, a boot ROM 1140 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
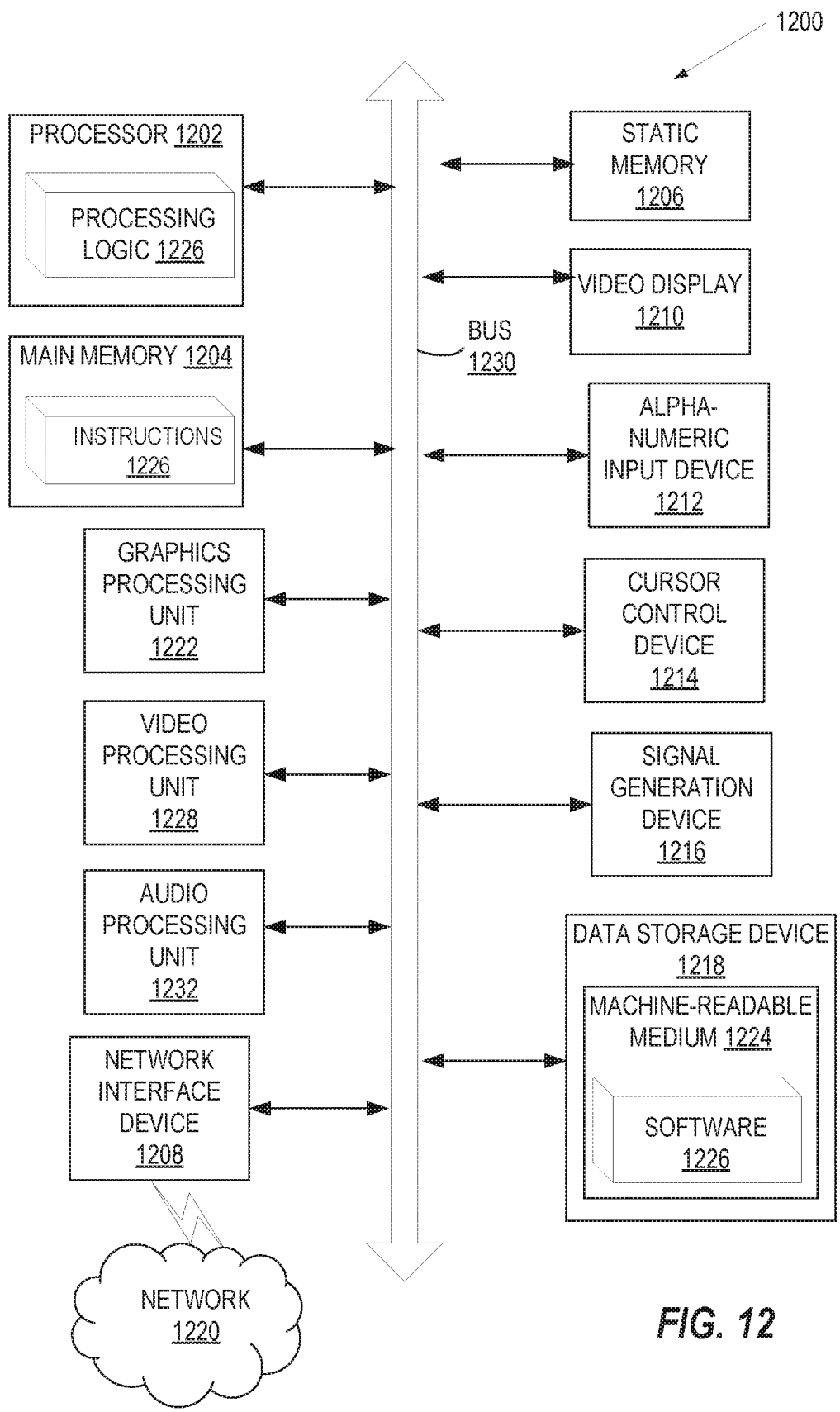
FIG. 12 illustrates a block diagram illustrating a computer system in which an embodiment of the disclosure may be used.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application-specific integrated circuit (ASIC), a field programmable gate array (FPGA), a digital signal processor (DSP), network processor, or the like. In one embodiment, processing device 1202 may include one or more processing cores. The processing device 1202 is configured to execute the processing logic 1226 for performing the operations and steps discussed herein. In one embodiment, processing device 1202 is the same as processor architecture 100 described with respect to FIG. 1 that implements techniques for supporting hierarchical ordering points as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a non-transitory machine-accessible storage medium 1224 on which is stored software 1226 implementing any one or more of the methodologies of functions described herein, such as implementing hierarchical ordering points on threads in a processing device, such as processing device 100 of FIG. 1, as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The non-transitory machine-readable storage medium 1224 may also be used to store instructions 1226 implementing the coherency controller 180 on threads in a processing device such as described with respect to processing device 100 in FIG. 1, and/or a software library containing methods that call the above applications. While the non-transitory machine-accessible storage medium 1224 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further embodiments.

Example 1 includes a processing device comprising: one or more cores; and a coherency circuit, operatively coupled to the cores, to: receive a plurality of memory access requests to be ordered by a first ordering point of the processing device; determine whether to stop the first ordering point based on a system event; responsive to determining that the first ordering point is stopped, identify a second ordering point of the processing device; and provide a memory access request of the plurality of memory access requests to the second ordering point.

Example 2 includes the processing device of example 1, wherein the coherency circuit is further to, responsive to determining that the first ordering point is stopped: complete in-flight memory access requests associated with the second ordering point; and responsive to completing the in-flight memory access requests, write cache data associated with the first ordering point to memory.

Example 3 includes the processing device of example 1, wherein the coherency circuit is further to: detect that the one or more cores are shutdown in accordance with the system event.

Example 4 includes the processing device of example 1, wherein the coherency circuit is further to: cause the second ordering point to send the provided memory access request to memory via a memory controller.

Example 5 includes the processing device of example 1, wherein the coherency circuit is further to: determine that the first ordering point is restarted based on a termination of the system event; and cause the second ordering point to expose memory data associated with one or more memory access requests to the first ordering point.

Example 6 includes the processing device of example 5, wherein to expose the memory data, the coherency circuit is further to: cause the second ordering point to generate a request for the memory data to be forwarded from an owner of the memory data to the first ordering point.

Example 7 includes the processing device of example 1, wherein the coherency circuit is further to: stop the first ordering point of the processing device; and direct the received plurality of memory access requests to be ordered by the second ordering point of the processing device.

Example 8 includes a method comprising: receiving by a processing device, a plurality of memory access requests to be ordered by a first ordering point of the processing device; determining, by the processing device, whether to stop the first ordering point based on a system event; responsive to determining that the first ordering point is stopped, identifying, by the processing device a second ordering point of the processing device; and providing, by the processing device, a memory access request of the plurality of memory access requests to the second ordering point.

Example 9 includes the method of example 8, further comprising, responsive to determining that the first ordering point is stopped: completing in-flight memory access requests associated with the second ordering point; and responsive to completing the in-flight memory access requests, writing cache data associated with the first ordering point to memory.

Example 10 includes the method of example 8, further comprising: detecting that the one or more cores are shutdown in accordance with the system event.

Example 11 includes the method of example 8, further comprising: causing the second ordering point to send the provided memory access request to memory via a memory controller.

Example 12 includes the method of example 8, further comprising: determining that the first ordering point is restarted based on a termination of the system event; and causing the second ordering point to expose memory data associated with one or more memory access requests to the first ordering point.

Example 13 includes the method of example 12, wherein exposing the memory data further comprises: causing the second ordering point to generate a request for the memory data to be forwarded from an owner of the memory data to the first ordering point.

Example 14 includes the method of example 8, further comprising: stopping the first ordering point of the processing device; and directing the received plurality of memory access requests to be ordered by the second ordering point of the processing device.

Example 15 includes a system comprising: a memory controller to access a memory shared by a plurality of cores; and a processing device, operatively coupled to the memory controller, to: receive a plurality of memory access requests to be ordered by a first ordering point of the processing device; determine whether to stop the first ordering point based on a system event; responsive to determining that the first ordering point is stopped, identify a second ordering point of the processing device; and provide a memory access request of the plurality of memory access requests to the second ordering point.

Example 16 includes the system of example 15, wherein the processing device is further to, responsive to determining that the first ordering point is stopped: complete in-flight memory access requests associated with the second ordering point; and responsive to completing the in-flight memory access requests, write cache data associated with the first ordering point to the memory.

Example 17 includes the system of example 15, wherein the processing device is further to: detect that the one or more cores are shutdown in accordance with the system event.

Example 18 includes the system of example 15, wherein the processing device is further to: determine that the first ordering point is restarted based on a termination of the system event; and cause the second ordering point to expose memory data associated with one or more memory access requests to the first ordering point.

Example 19 includes the system of example 18, wherein to expose the memory data, the processing device is further to: cause the second ordering point to generate a request for the memory data to be forwarded from an owner of the memory data to the first ordering point.

Example 20 includes the system of example 15, wherein the processing device is further to: stop the first ordering point of the processing device; and direct the received plurality of memory access requests to be ordered by the second ordering point of the processing device.

While the disclosure has been described respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and/or 'operable to,' in one embodiment, refers to some apparatus, logic, hardware, and/or element designed in such a way to enable use of the apparatus, logic, hardware, and/or element in a specified manner. Note as above that use of, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, values or portions of values may represent states. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising:
one or more cores; and
a coherency circuit, operatively coupled to the cores, to:
receive a plurality of memory access requests to be ordered by a first ordering point of the processing device;
determine whether to stop the first ordering point based on a system event;
detect that the one or more cores are shutdown in response to the system event;
responsive to determining that the first ordering point is stopped, identify a second ordering point of the processing device; and
provide a memory access request of the plurality of memory access requests to the second ordering point.

2. The processing device of claim 1, wherein the coherency circuit is further to, responsive to determining that the first ordering point is stopped:
complete in-flight memory access requests associated with the second ordering point; and
responsive to completing the in-flight memory access requests, write cache data associated with the first ordering point to memory.

3. The processing device of claim 1, wherein the coherency circuit is further to:
cause the second ordering point to send the provided memory access request to memory via a memory controller.

4. The processing device of claim 1, wherein the coherency circuit is further to:
determine that the first ordering point is restarted based on a termination of the system event; and
cause the second ordering point to expose memory data associated with one or more memory access requests to the first ordering point.

5. The processing device of claim 4, wherein to expose the memory data, the coherency circuit is further to:
cause the second ordering point to generate a request for the memory data to be forwarded from an owner of the memory data to the first ordering point.

6. The processing device of claim 1, wherein the coherency circuit is further to:
stop the first ordering point of the processing device; and
direct the received plurality of memory access requests to be ordered by the second ordering point of the processing device.

7. A method comprising:
receiving by a processing device, a plurality of memory access requests to be ordered by a first ordering point of the processing device;
determining, by the processing device, whether to stop the first ordering point based on a system event;
detecting that one or more cores of the processing device are shutdown in response to the system event;
responsive to determining that the first ordering point is stopped, identifying, by the processing device a second ordering point of the processing device; and
providing, by the processing device, a memory access request of the plurality of memory access requests to the second ordering point.

8. The method of claim 7, further comprising, responsive to determining that the first ordering point is stopped:
completing in-flight memory access requests associated with the second ordering point; and
responsive to completing the in-flight memory access requests, writing cache data associated with the first ordering point to memory.

9. The method of claim 7, further comprising:
causing the second ordering point to send the provided memory access request to memory via a memory controller.

10. The method of claim 7, further comprising:
determining that the first ordering point is restarted based on a termination of the system event; and
causing the second ordering point to expose memory data associated with one or more memory access requests to the first ordering point.

11. The method of claim 10, wherein exposing the memory data further comprises:
causing the second ordering point to generate a request for the memory data to be forwarded from an owner of the memory data to the first ordering point.

12. The method of claim 7, further comprising:
stopping the first ordering point of the processing device; and
directing the received plurality of memory access requests to be ordered by the second ordering point of the processing device.

13. A system comprising:
a memory controller to access a memory shared by a plurality of cores; and
a processing device, operatively coupled to the memory controller, to:
receive a plurality of memory access requests to be ordered by a first ordering point of the processing device;
determine whether to stop the first ordering point based on a system event;
detect that the plurality of cores are shutdown in response to the system event;
responsive to determining that the first ordering point is stopped, identify a second ordering point of the processing device; and
provide a memory access request of the plurality of memory access requests to the second ordering point.

14. The system of claim 13, wherein the processing device is further to, responsive to determining that the first ordering point is stopped:
complete in-flight memory access requests associated with the second ordering point; and
responsive to completing the in-flight memory access requests, write cache data associated with the first ordering point to the memory.

15. The system of claim 13, wherein the processing device is further to:
determine that the first ordering point is restarted based on a termination of the system event; and
cause the second ordering point to expose memory data associated with one or more memory access requests to the first ordering point.

16. The system of claim 15, wherein to expose the memory data, the processing device is further to:
cause the second ordering point to generate a request for the memory data to be forwarded from an owner of the memory data to the first ordering point.

17. The system of claim 13, wherein the processing device is further to:
- stop the first ordering point of the processing device; and
- direct the received plurality of memory access requests to be ordered by the second ordering point of the processing device.

* * * * *